Aug. 15, 1961 F. R. MARSHALL 2,995,904
CONTROL APPARATUS
Filed March 22, 1960 2 Sheets-Sheet 2

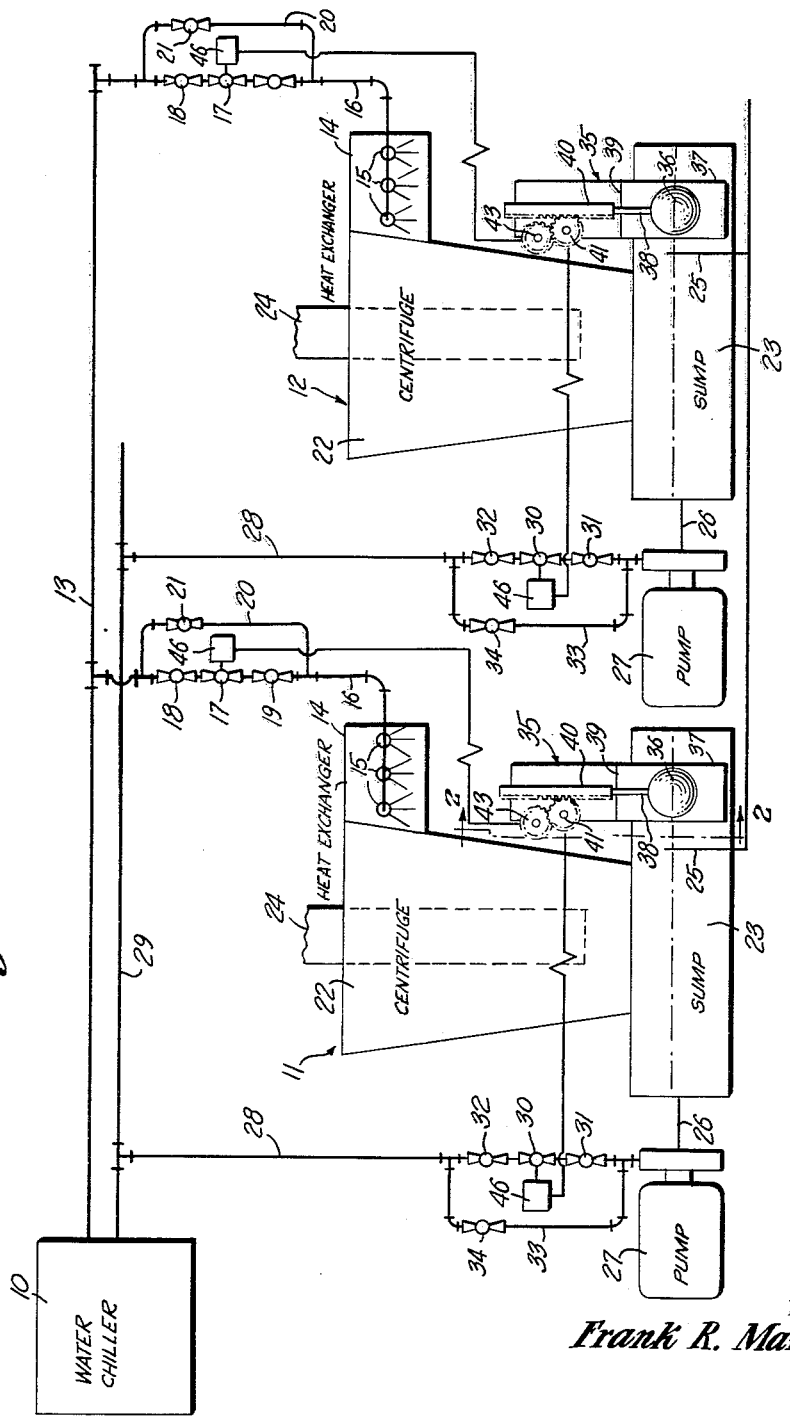

INVENTOR
Frank R. Marshall
BY Martha L. Ross
AGENT

United States Patent Office 2,995,904
Patented Aug. 15, 1961

2,995,904
CONTROL APPARATUS
Frank Raymond Marshall, Alexandria, Va., assignor to Atlantic Research Corporation, a corporation of Virginia
Filed Mar. 22, 1960, Ser. No. 16,686
7 Claims. (Cl. 62—171)

The present invention relates in general to chilled water air conditioning systems of the water-spray type, and, more particularly, to chilled water air conditioning systems having a plurality of water-spray heat exchanger and water-separator units disposed at spaced locations about the area to be cooled, wherein means are provided for automatically regulating inflow and outflow of chilled water to the heat exchanger and water-separator unit to maintain balance between water pressure at the several units.

Heretofore, a common type of industrial or commercial air conditioning installation which as been in general use includes a suitable central station having means for producing chilled water as by passing water from a suitable source of supply over refrigeration coils, together with a plurality of air conditioning substations or units located at various places throughout the building to be served by the system. These substations or units each include a water-spray type of heat exchanger into which air to be conditioned is drawn at high velocity and cooled by subjecting the air to a fine mist spray of the chilled water, together with a centrifuge to separate by centrifugal action the air and water discharged from the heat exchanger, the separated cooled air being then supplied through ducts to the area to be conditioned and the water being dropped into a sump to be pumped back to the water chiller at the central station. In such installations, it was desirable to maintain as high a water pressure as possible at the spray nozzles of the heat exchangers without overflowing chilled water into the overflow waste drain of the sump associated with each centrifuge. This posed a difficult problem because every heat exchanger was fed by a common chilled water line and returned the water from the sump to the chiller by a common return line. Since the heat exchangers in many industrial installations were located at widely spaced points within the building and frequently at different elevations, it was nearly impossible to maintain equal water pressure and balance at the several heat exchanger stations without overflowing one or more stations. Such installations required that the operating engineers or maintenance personnel constantly make tours of the heat exchanger stations to adjust the inlet and outlet valves controlling the inflow and outflow of water from the heat exchanger station in an effort to maintain equal water pressure and balance. This, of course, resulted in very high operating and overhead costs.

An object of the present invention is the provision of a novel chilled water aid conditioning system of the water-spray type wherein means are provided for automatically regulating the inflow and outflow of water to each of a plurality of water-spray heat exchanger stations to achieve a continuous selected balance between the water pressure conditions at the several heat exchanger stations.

Another object of the present invention is the provision of a novel chilled water air conditioning system having a plurality of water-spray heat exchanger stations each including a heat exchanger, a water and cooled air separator and a sump for collecting the separated water, together wth automatic modulated inlet and outlet valves regulating chilled water supply and return from each heat exchanger station for automatically maintaining the water pressure at each heat exchanger at a level just below that which would produce overflowing of chilled water from the sump at that station.

Another object of the present invention is the provision of such an automatic motorized modulating valve system for regulating water pressure at each water-spray heat exchanger which is continuously responsive to the water level in the associate sump.

Another object of the present invention is the provision of a system of motorized modulating valves for regulating conditions in a slave facility together with rotary electrical potentiometers responsive in preselected relation to a physical condition indicative of the condition to be regulated to operate one valve at a time in selected directions.

Other objects, advantages, and capabilities of the present invention will become apparent from the following detailed description, taken in conjunction with the accompanying drawings illustrating one preferred embodiment of the invention.

In the drawings:
FIGURE 1 is a schematic diagram of portions of a chilled water air conditioning system adapted to operate in conjunction with a remote water chiller and embodying the present invention;
FIGURE 2 is a vertical transverse fragmentary section view taken along the line 2—2 of FIGURE 1 and illustrating details of construction of the water level sensing float unit and potentiometer activated thereby;
FIGURE 3 is a vertical section view taken along the line 3—3; and
FIGURE 4 is a schematic diagram of an electrical circuit illustrating the manner in which the potentiometers and motorized valves may be interconnected to accomplish the purposes of the present invention.

Referring to the drawings wherein like reference characters designate corresponding parts throughout the several figures, the air conditioning system embodying the present invention includes a conventional water chiller unit, indicated in block diagram form by the reference character 10, designed to effect cooling of water and supplying of the same to a plurality of heat exchanger stations, indicated generally by the reference characters 11 and 12, through a common chilled water supply line 13. The water chiller may incorporate a water-spray tower, refrigeration coils, or any other well-known commercial form of chiller unit. Each heat exchanger station 11, 12, which will here be assumed to be located at different elevations within the building to be served by the air conditioning system, will include a heat exchanger 14 of conventional construction adapted to have air drawn therethrough at high velocity and having a plurality of nozzles or spray heads 15 to be supplied with chilled water from the common supply line 13 through the branch supply line 16 and reduce the chilled water to a fine mist. The heat exchange is achieved by passing high velocity air through this mist of chilled water. Regulation of the flow of chilled water from the common supply line 13 to the spray nozzles 15 is achieved by means of a modulating valve 17 interposed in the branch supply line 16. The branch supply line, in accordance with conventional practice, will also preferably include conventional servicing valves 18 and 19 located immediately upstream and downstream from the modulating valve 17 and a by-passing line 20 which is also controlled by a manual servicing valve 21.

Adjacent to and in communication with each heat exchanger 14 is a centrifuge 22 which may be of conventional commercially available construction, which separates the air and water by centrifugal action and drops the separated water into the sump 23 communicating with and disposed below the centrifuge 22. The centrifuge 22 also has an air outlet duct, indicated schematically at 24, through which the separated air is drawn and moved to the area to be cooled.

The sump 23 at each heat exchanger station 11, 12 includes an overflow waste drain 25 which connects to the sewer to discharge overflow water from the sump 23, and a return outlet 26 through which water in the sump 23 is drawn by a pump 27 and forced through the branch return line 28 to a common return line 29 and thence to the chiller 10. The common return line 28 also includes a modulating valve 30 for regulating outflow from the sump 23 to the common return line 29, together with the usual upstream and downstream manual servicing valves 31 and 32 and the by-pass line 33 having a manual servicing valve 34 therein.

As previously described, in the usual commercial installation of this general type of air conditioning system, the inlet modulating valve 17 and outlet modulating valve 30 are manual valves which must be continuously adjusted by the supervising personnel to maintain the maximum water pressure at the spray heads 15 without overflowing chilled water from the sump 23 through the overflow waste drain 25. In the system of the present invention, the inlet and outlet modulating valves 17 and 30 are controlled in accordance with the water level in the sump 23 of the associated heat exchanger station. To this end, each sump 23 additionally includes a float unit 35 including a spherical float 36 housed within a perforated can 37 to maintain a still water condition and having a vertically extending float rod or stem 38 guided for rectilinear vertical movement in an accommodating opening in the top 39 of the can 37. A rack 40 is fixed to the exterior end of the float rod 38, the teeth of which are meshed to the teeth of a gear 41 fixed to the shaft of a rotary potentiometer 42. Thus, the shaft and rotatable contact arm of the potentiometer 42 are continuously driven in accordance with the position of the float 36, which in turn is responsive to the water level existing in the sump 23. The potentiometer gear 41 is in turn meshed with a similar gear 43 mounted on the shaft of a second rotary potentiometer 44.

In the specific embodiment herein described, the potentiometers 42 and 44 are 270 ohm potentiometers. For convenience in mounting the potentiometers 42, 44 and gears 41, 43, a sheet metal angle bracket 45 is fixed to the top 39 of the can 37 and rises alongside and parallel to the axis of movement of the rack 40 and float rod 38.

Each of the modulating valves 17 and 30 is of the motorized type wherein the valve is driven by an electric motor 46 in direction and amount of movement determined by the adjustment of one of the potentiometers 42, 44. The electric control circuit for each of the motorized modulating valves 17, 30 is illustrated in FIGURE 4.

Referring to FIGURE 4, the motor 46 for each modulating valve 17, 30 includes forward and reverse windings 47 and 48 coupled at one end through the lead 49 to the secondary terminal 50 of the supply transformer 51 and coupled at their other ends through limit switches 52 and 53 and the movable contact 54 of a balancing relay 55 to the other terminal 56 of the transformer secondary. The shaft 57 of the motor 46 is directly connected to the movable contact arm 58 adjustable over the resistance element 59 of a 135 ohm motor-balancing potentiometer 60 to position the contact arm 58 along the resistance element 59 in accordance with the angular position of the motor shaft 57. The contact arm 58 is also connected directly to the transformer secondary terminal 56. The opposite ends of the resistance element 59 of potentiometer 60 are connected through leads 61 and 62 including the coils 63 and 64 respectively of the balancing relay 55 to corresponding ends of the resistance element 65 of the control potentiometer, which is either the potentiometer 42 or potentiometer 44. The movable contact arm 66 of the control potentiometer 42 or 44, which is positioned in accordance with the angular position of the gear 41 or 43, respectively, established by the rack 40, is also directly connected through the lead 67 to the secondary transformer terminal 50. The limit switches 52 and 53 are switches which are provided on the motor housing and are opened by stops or lugs on the motor armature or shaft to open circuit the electrical supply to the motor field windings 47, 48 at selected angular limit positions of the motor shaft 57.

The relationship of the teeth of the rack 40 and potentiometer 42 are such that the arm 66 of the potentiometer 42 will be rotated through about 270° for a two inch change in water level. The potentiometer 42 controls the motor 46 of the outlet modulating valve 30 and the potentiometer 44 controls the motor 46 of the inlet modulating valve 17. Under normal conditions, the arm 58 of the motor balancing potentiometer 60 will occupy a balancing condition relative to the arm 66 of the control potentiometer (either the potentiometer 42 or 44) whereby the electrical impedance through the portions R1 and R3 of the resistance elements 65 and 59 and their associated balancing relay coil 63 equals the impedance through the portions R2 and R4 of the resistance elements 65 and 59 and the balancing relay coil 64. When a rise in water level occurs, the float 36 and the rack 40 will rise, rotating the gears 41 and 43 in the directions shown by the arrows in FIGURE 3. Rotation of the gear 41 shifts the potentiometer arm 66 of the potentiometer 42 or 44 in a direction unbalancing the impedance of the parallel paths through the balancing relay coils 63, 64 between the contact points of the potentiometer arms 66 and 58. The unbalance in flux produced by the two balancing relay coils 63, 64 as a result of the differences in current flowing through the two parallel paths, shifts the balancing relay contact 54 into engagement with one of the associate stationary contacts, thus completing the circuit to one of the motor field windings 47, 48 to rotate the motor in the direction determined by the field winding which is energized. Rotation of the motor will continue until the motor shaft 57 has driven the motor balancing potentiometer arm 58 to a condition of balance, or until one of the limit switches 52, 53 is open, whichever first occurs.

When the limit switches 52, 53 open circuit the supply circuit to either of the motor windings 47, 48 before the motor balancing potentiometer arm 58 is driven to a balancing position relative to the control potentiometer arm 66, there will be a range along the control potentiometer resistance 65 between the adjusted position of the arm 66 and the balancing position relative to the potentiometer 60 over which movement of the control potentiometer arm 66 will not produce any unbalance in the current flowing through the balancing relay coils 63, 64. That is to say that if the arm 66 of the control potentiometer were shifted to the left as viewed in FIGURE 4 to an adjusted position which the potentiometer 60 could not balance before the limit switch 52 opened, the arm 66 would have to be moved to the right through an initial range along the resistance 65 until it passed beyond the impedance-balancing position relative to the arm 58 of potentiometer 60 before the relay coil 64 would be activated to draw the contact arm 54 to the right hand stationary relay contact and energize the motor winding 48. This initial ineffective range of the resistance 65 is hereinafter termed its "inactive zone."

When the water level in the sump 23 is at a normal level, the outlet valve 30 will be at about the three-quarter open condition and the inlet valve 17 will be fully open with its control potentiometer overdriven to an extent providing an inactive zone of the length which would be traversed by the associated potentiometer arm during movement of the outlet valve from three-quarter open to fully open condition.

The initial adjustment of the valves and potentiometers is such that when the float 37 rises through a selected distance above the normal water level producing 90° rotation of the gear 41, the potentiometer 42 will be adjusted to activate the associated motor 46 to open the outlet modulating valve 30 progressively from its normal three-quarter open position to fully opened position. During this range of adjustment of the potentiometer 42 and outlet valve 30, the movable arm 66 of the potentiometer 44 controlling the motor 46 for inlet valve 17 will merely be moved over the inactive zone of its resistance element 65, that is, the potentiometer arm 66 will be moving through the initial range of movement required to bring it into balance with the associate motor balancing potentiometer arm 58. Upon a further rise of the water level rotating the gear 41 through the next 90°, the outlet valve 30 will remain open, while the inlet valve 17 will be progressively closed to about a one-half closed condition due to movement of the arm 66 of the potentiometer 44 over its associate resistance element 65. During this extent of movement of the gears 41, 43, the potentiometer arm 66 of the potentiometer 42 will be moved over an inactive zone of the resistance element 65, since the limit switch 52 or 53 associated with the field winding which caused the outlet valve 30 to be opened was open-circuited when the valve reached fully open condition. During the next 90 degrees of rotation of the gears 41, 43, the arm 66 of the potentiometer 44 will continue to be shifted along its associate resistance element 65 in a direction to cause the motor 46 to fully close the inlet valve 17 and the potentiometer arm 66 of the outlet valve controlling potentiometer 42 will be shifted still farther into the inactive zone of its associated resistance element 65.

As the water level in the sump 23 falls from this maximum level condition wherein the outlet valve 30 is fully open and the inlet valve 17 is fully closed, the lowering of the float 36 and rack 40 moves the arms of the potentiometers 42 and 44 in the opposite direction. Such movement of the arm 66 of potentiometer 44 produces an unbalance in the current through the balancing relay winding 63 or 64 to energize the motor winding 47 or 48 associated with the motor for the inlet valve 17 and progressively open the same until the inlet valve 17 reaches the fully open position, at which point the appropriate limit switch 52 or 53 open-circuits the supply to the motor winding. At this point, the movable arm of the potentiometer 42 will have been driven fully through the inactive zone of the associated resistance element 65 and further movement of the arm of potentiometer 42 responsive to further lowering of the water level will activate the associated balancing relay 55 to energize the motor winding of the motor 46 coupled with outlet valve 30 to progressively close the valve and progressively overdrive the potentiometer 44 farther into the inactive zone. Thus, for example, if the water level falls below its normal level, the movement of the float 36 and rack 40 effects only a progressive closing down of the outlet valve 30 while the inlet valve 17 remains fully open and its potentiometer 44 progresses farther and farther into the inactive zone.

By this arrangement, the entire system is automatically maintained in balance at all times by adjustment of the inlet and outlet modulating valves associated with each heat exchanger station 11, 12 in response to movement of the float 36 continuously sensing the water level in the associated sump 23. Since the valves at each heat exchanger station are activated one at a time due to the particular control circuits described above, the valves are prevented from opposing each other for position and hunting is avoided.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

I claim:

1. A liquid level controlling system comprising a tank, means for supplying liquid to said tank, means for discharging liquid from said tank, an inlet modulating valve for regulating the rate of supply of liquid to said tank, an outlet modulating valve for regulating the rate of discharge of liquid from said tank, a reversible electric motor associated with each of said modulating valves for effecting adjustment of the associated valve in reverse directions selectively, a float operable in response to variations in the liquid level in said tank, a pair of rotary electrical potentiometers, means intercoupling said potentiometers with said float to continuously adjust each of said potentiometers in selected relation to the position of said float, electrical control circuit means intercoupling each of said potentiometers respectively with one of said reversible electric motors and including means responsive to variations in the resistance settings of said potentiometers for energizing said electric motors in direction and extent to adjust their associated modulating valves to restore a preselected liquid level in said tank upon variation of the liquid level from said preselected liquid level.

2. A liquid level controlling system comprising a tank, means for supplying liquid to said tank, means for discharging liquid from said tank, an inlet modulating valve for regulating the rate of supply of liquid to said tank, a reversible electric motor for adjusting said inlet valve in reverse directions selectively, an outlet modulating valve for regulating the rate of discharge from said tank, a reversible electric motor for adjusting said outlet valve in reverse directions selectively, a float disposed in said tank for movement in response to variations in the liquid level in said tank, a pair of rotary electric potentiometers, means intercoupling said potentiometers with said float to continuously adjust each of the potentiometers in preselected relation to the position of said float, electric control circuit means for each reversible electric motor intercoupled with a different one of said potentiometers including means responsive to variations in the resistance settings of the potentiometers for energizing said electric motors in direction and extent to adjust their associated modulating valves to restore a preselected liquid level in said tank upon variation of the liquid level from said preselected liquid level, said control circuit means including means to limit said motors to operation one at a time.

3. A liquid level controlling system comprising a tank, means for supplying liquid to said tank, means for discharging liquid from said tank, an inlet modulating valve for regulating the rate of supply of liquid to said tank, a reversible electric motor for adjusting said inlet valve in reverse directions selectively, an outlet modulating valve for regulating the rate of discharge from said tank, a reversible electric motor for adjusting said outlet valve in reverse directions selectively, a float disposed in said tank for movement in response to variations in the liquid level in said tank, a pair of rotary electric potentiometers, means interconnecting said potentiometers with said float to continuously adjust the potentiometers in preselected relation to the position of said float, electric control circuit means for each motor intercoupled with a different one of said potentiometers including means responsive to variations in the adjustment of the potentiometers upon variation in the liquid level from a normal level to energize the motors and adjust the valves in directions to restore the normal liquid level, said control circuit means including limit switch means operated in preselected relation to the position of said valves to limit each of said motors to operation when the valve associated with the other of said motors is fully open.

4. In an air conditioning unit of the type having a plurality of heat exchanger units each including a bank of liquid spray nozzles for producing a spray in the path of a forced air stream to cool the air, means for separating water from the air, and a sump tank for receiving the separated water, a central water chiller unit for supplying chilled water from said water chiller unit to the bank of spray nozzles of said heat exchanger units in parallel, and means for returning water from the sump tank of each of said heat exchanger units to said water chiller unit; the improvement comprising means for automatically regulating the inflow and outflow of water at each of said heat exchanger units to maintain a selected balance between the water pressure at the spray nozzles of the plurality of heat exchanger units including an inlet modulating valve for each heat exchanger unit for regulating the rate of supply of water from said chiller unit to the bank of spray nozzles of the associated heat exchanger unit, an outlet modulating valve for each heat exchanger unit for regulating the rate of return of water from the sump tank of the associated heat exchanger unit to the chiller unit, a reversible electric motor for each of said valves for adjusting the associated valve in reverse directions selectively, a float disposed in each sump tank for movement in response to variations in the water level in said tank from a normal water level, a pair of rotary electric potentiometers intercoupled with said float to be continuously adjusted in accordance with the position of the float, and control means for each of said motors responsive to variations in the adjustment of a respective one of said potentiometers for energizing the motors to adjust their associated valves to alter inflow and outflow of water therethrough in a sense to restore the normal water level in said sump tank.

5. In an air conditioning unit of the type having a plurality of heat exchanger units each including a bank of liquid spray nozzles for producing a spray in the path of a forced air stream to cool the air, means for separating water from the air, and a sump tank for receiving the separated water, a central water chiller unit for supplying chilled water from said water chiller unit to the bank of spray nozzles of said heat exchanger units in parallel, and means for returning water from the sump tank of each of said heat exchanger units to said water chiller unit; the improvement comprising means for automatically regulating the inflow and outflow of water at each of said heat exchanger units to maintain a selected balance between the water pressure at the spray nozzles of the plurality of heat exchanger units including an inlet modulating valve for each heat exchanger unit for regulating the rate of supply of water from said chiller unit to the bank of spray nozzles of the associated heat exchanger unit, an outlet modulating valve for each heat exchanger unit for regulating the rate of return of water from the sump tank of the associated heat exchanger unit to the chiller unit, a reversible electric motor for each of said valves for adjusting the associated valve in reverse directions selectively, a float disposed in each sump tank for movement in response to variations in the water level in said tank from a normal water level, a pair of rotary electric potentiometers intercoupled with said float to be continuously adjusted in accordance with the position of the float, and an electric control circuit for each of said motors responsive to a respective one of said potentiometers for energizing the motors upon variation of the adjustment of the the associated potentiometers due to rise or fall of the water level in said sump tank to adjust the inlet valves to reduce or increase inflow therethrough respectively and adjust the outlet valves in the opposite sense to restore the normal water level in the sump tank.

6. In an air conditioning unit of the type having a plurality of heat exchanger units each including a bank of liquid spray nozzles for producing a spray in the path of a forced air stream to cool the air, means for separating water from the air, and a sump tank for receiving the separated water, a central water chiller unit for supplying chilled water from said water chiller unit to the bank of spray nozzles of said heat exchanger units in parallel, and means for returning water from the sump tank of each of said heat exchanger units to said water chiller unit; the improvement comprising means for automatically regulating the inflow and outflow of water at each of said heat exchanger units to maintain a selected balance between the water pressure at the spray nozzles of the plurality of heat exchanger units including an inlet modulating valve for each heat exchanger unit for regulating the rate of supply of water from said chiller unit to the bank of spray nozzles of the associated heat exchanger unit, an outlet modulating valve for each heat exchanger unit for regulating the rate of return of water from the sump tank of the associated heat exchanger unit to the chiller unit, a reversible electric motor for each of said valves for adjusting the associated valve in reverse directions selectively, a float disposed in each sump tank for movement in response to variations in the water level in said tank from a normal water level, a pair of rotary electric potentiometers intercoupled with said float to be continuously adjusted in accordance with the position of the float, and an electric control circuit for each of said motors responsive to a respective one of said potentiometers for energizing the motors upon variation of the adjustment of the associated potentiometers due to rise or fall of the water level in said sump tank to adjust the inlet valves to reduce or increase inflow therethrough respectively and adjust the outlet valves in the opposite sense, said control circuits including means adjusted by the motors for sensing the relative positions of the motor shafts and the adjustments of said potentiometers to terminate energization of the motors by their control circuits in preselected relation to the extent of variation of the potentiometer adjustments.

7. In an air conditioning unit of the type having a plurality of heat exchanger units each including a bank of liquid spray nozzles for producing a spray in the path of a forced air stream to cool the air, means for separating water from the air, and a sump tank for receiving the separated water, a central water chiller unit for supplying chilled water from said water chiller unit to the bank of spray nozzles of said heat exchanger units in parallel, and means for returning water from the sump tank of each of said heat exchanger units to said water chiller unit; the improvement comprising means for automatically regulating the inflow and outflow of water at each of said heat exchanger units to maintain a selected balance between the water pressure at the spray nozzles of the plurality of heat exchanger units including an inlet modulating valve for each heat exchanger unit for regulating the rate of supply of water from said chiller unit to the bank of spray nozzles of the associated heat exchanger unit, an outlet modulating valve for each heat exchanger unit for regulating the rate of return of water from the sump tank of the associated heat exchanger unit to the chiller unit, a reversible electric motor for each of said valves for adjusting the associated valve in reverse directions selectively, a float disposed in each sump tank for movement in response to variations in the water level in said tank from a normal water level, a pair of rotary electric potentiometers intercoupled with said float to be continuously adjusted in accordance with the position of the float, and an electric control circuit for each of said motors responsive to a respective one of said potentiometers for energizing the motors upon variation of the adjustment of the associated potentiometers due to rise or fall of the water level in said sump tank to adjust the inlet valves to reduce or increase inflow therethrough respectively and adjust the outlet valves in the opposite sense, said control circuits including means adjusted by the motors for sensing the relative positions of the motor shafts and the adjustments of said potentiometers to terminate energization of the motors by their control circuits in preselected relation to the extent of variation of the potentiometer adjustments, and limit switch means for each of the motors associated with a pair of inlet and outlet valves operated in preselected relation to the position of the pair of valves and said potentiometers to limit each of said motors for one of the valves to operate only when the other valve is fully open.

References Cited in the file of this patent

UNITED STATES PATENTS

| | | |
|---|---|---|
| 2,739,608 | Brower | Mar. 27, 1956 |
| 2,885,118 | Remke | May 5, 1959 |